(12) United States Patent
Satou

(10) Patent No.: US 11,809,146 B2
(45) Date of Patent: *Nov. 7, 2023

(54) MACHINE LEARNING DEVICE, PREDICTION DEVICE, AND CONTROL DEVICE FOR PREVENTING COLLISION OF A MOVEABLE PART

(71) Applicant: FANUC CORPORATION, Yamanashi (JP)

(72) Inventor: Hirochika Satou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 417 days.

This patent is subject to a terminal disclaimer.

(21) Appl. No.: 17/084,065

(22) Filed: Oct. 29, 2020

(65) Prior Publication Data

US 2021/0132553 A1 May 6, 2021

(30) Foreign Application Priority Data

Nov. 6, 2019 (JP) ................................. 2019-201662

(51) Int. Cl.
G05B 13/02 (2006.01)
G06N 20/00 (2019.01)
G05D 3/10 (2006.01)

(52) U.S. Cl.
CPC ............. G05B 13/027 (2013.01); G05D 3/10 (2013.01); G06N 20/00 (2019.01)

(58) Field of Classification Search
CPC .................................. G06N 20/00; G05D 3/10

USPC .......................................................... 700/104
See application file for complete search history.

(56) References Cited

U.S. PATENT DOCUMENTS

| 2017/0087654 | A1* | 3/2017 | Abe ........................ G05B 19/19 |
| 2017/0228644 | A1 | 8/2017 | Kurokawa |
| 2017/0270434 | A1* | 9/2017 | Takigawa ............... B23K 26/38 |
| 2018/0210427 | A1* | 7/2018 | Cella ........................ H04L 67/12 |
| 2019/0179300 | A1* | 6/2019 | Cella ................... G06F 18/2178 |
| 2021/0383250 | A1* | 12/2021 | Uejima .................. G06N 3/045 |

FOREIGN PATENT DOCUMENTS

| JP | 4221016 | 2/2009 |
| JP | 2017-138881 A | 8/2017 |
| JP | 6290835 B2 | 3/2018 |

* cited by examiner

*Primary Examiner* — Md Azad
(74) *Attorney, Agent, or Firm* — Wenderoth, Lind & Ponack, L.L.P.

(57) ABSTRACT

To prevent a collision of a movable part without generating an alarm excessively in manual feed. A machine learning device includes: a state observation unit that acquires, as input data, manual feed state information including a manual feed pulse waveform at a time of a manual feed operation in any manual feed operation performed in a machine tool capable of manual feed; a label acquisition unit that acquires label data indicating a distance by which a movable part of the machine tool moved within a predetermined time immediately after the manual feed pulse waveform of the manual feed state information included in the input data; and a learning unit that executes supervised learning by using the input data acquired by the state observation unit and the label data acquired by the label acquisition unit, and generates a learned model.

8 Claims, 11 Drawing Sheets

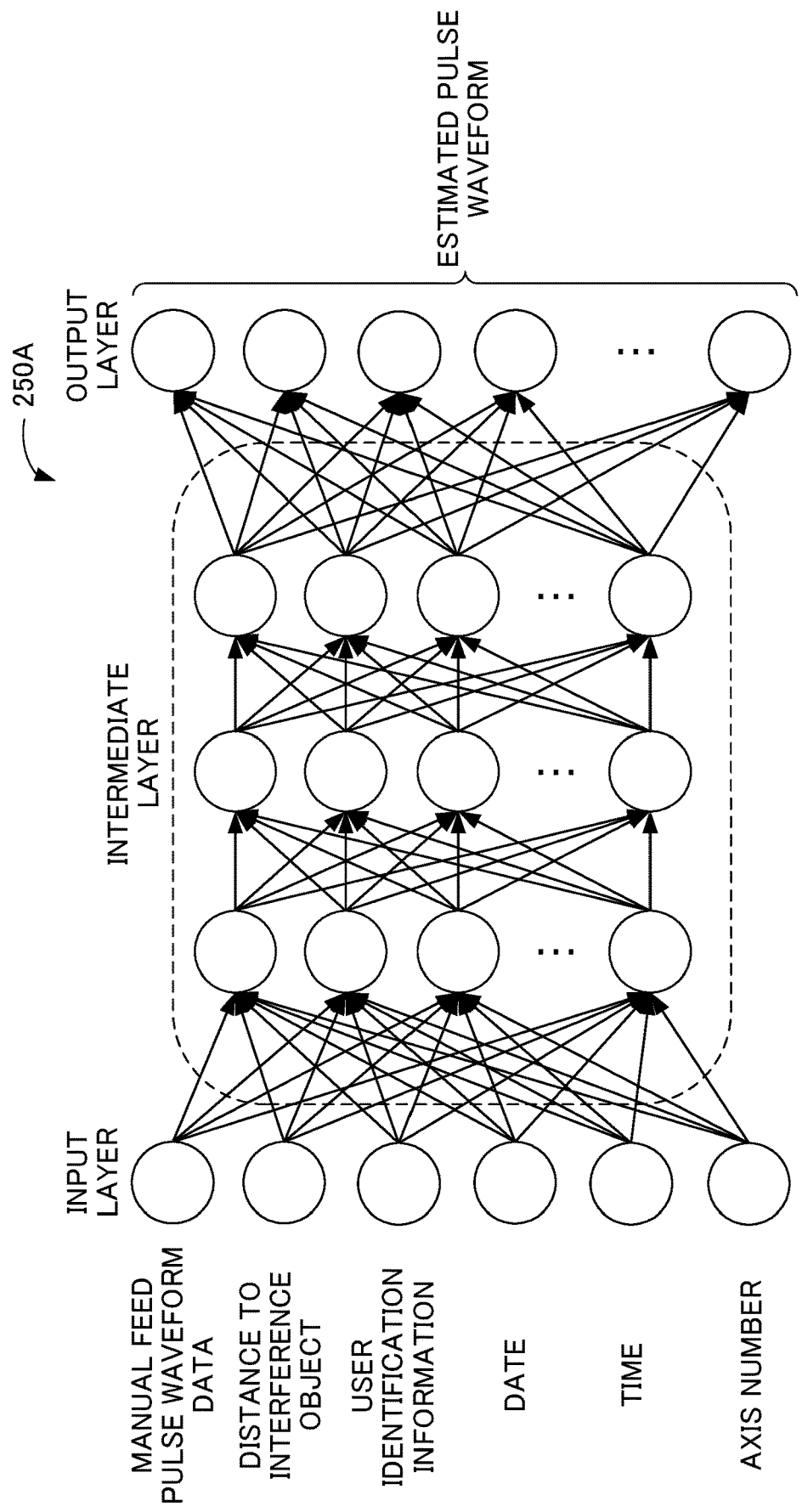

MACHINE LEARNING DEVICE, PREDICTION DEVICE, AND CONTROL DEVICE FOR PREVENTING COLLISION OF A MOVEABLE PART

This application is based on and claims the benefit of priority from Japanese Patent Application No. 2019-201662, filed on 6 Nov. 2019, the content of which is incorporated herein by reference.

BACKGROUND OF THE INVENTION

Field of the Invention

The present invention relates to a machine learning device, a prediction device, and a control device.

Related Art

In a machine tool, in order to prevent the collision of a movable part of a tool or the like, technology has been known which performs interference check based on the position of the movable part at a preceding time calculated from a machining program to be executed and a contour model in which the contour of the movable part and the contour of a fixed part are stored in advance and, when it is determined that interference will occur, decelerates and stops the movable part, or generates an alarm. For example, refer to Patent Document 1.

Patent Document 1: Japanese Patent No. 4221016

SUMMARY OF THE INVENTION

However, there are some machine tools having a movable part that can be manually fed. In this case, since the machining program is not executed and the user moves the movable part in real time, it is difficult to predict the future position of the movable part.

In this case, as a method is conceivable for predicting the future position of the movable part, a method for calculating a future position of the movable part and performing interference check based on the assumption that the state of the present pulse signal (i.e., the operation of the manual feed) is maintained by using the pulse signal generated by a manual handle operated by the user during the manual feed. However, if the user does not turn the manual handle continuously, or even if the user carefully turns the manual handle near an interfering object such as a workpiece or table, in the above-described method, it may be considered to interfere with the interfering object based on the calculated future position and an alarm may be generated. As a result, since an alarm will be excessively generated, the intended operation of the user is interrupted, and the work efficiency may decline.

Therefore, it is desired to prevent collision of the movable part without excessively generating an alarm in the manual feed.

(1) One aspect of a machine learning device according to this disclosure includes: a state observation unit that acquires, as input data, manual feed state information including a manual feed pulse waveform at a time of a manual feed operation in any manual feed operation performed in a machine tool capable of manual feed; a label acquisition unit that acquires label data indicating a distance by which a movable part of the machine tool moved within a predetermined time immediately after the manual feed pulse waveform of the manual feed state information included in the input data; and a learning unit that executes supervised learning by using the input data acquired by the state observation unit and the label data acquired by the label acquisition unit, and generates a learned model.

(2) One aspect of a prediction device according to this disclosure includes a learned model generated by the machine learning device described in (1); an input unit that inputs the manual feed state information of manual feed currently performed with respect to a machine tool capable of manual feed; and a prediction unit that inputs the manual feed state information inputted by the input unit to the learned model and predicts a moving distance of a movable part of the machine tool after a predetermined time from a present time based on the manual feed state information.

(3) One aspect of a control device according to this disclosure includes the prediction device described in (2).

According to an aspect, it is possible to prevent a collision of the movable part without excessively generating an alarm in the manual feed.

BRIEF DESCRIPTION OF THE DRAWINGS

FIG. 10 is a diagram showing an example of a learned model outputting an estimated pulse waveform;

DETAILED DESCRIPTION OF THE INVENTION

Hereinafter, a description will be given of an embodiment of the present disclosure with reference to the drawings.

Embodiment

Figure 1:
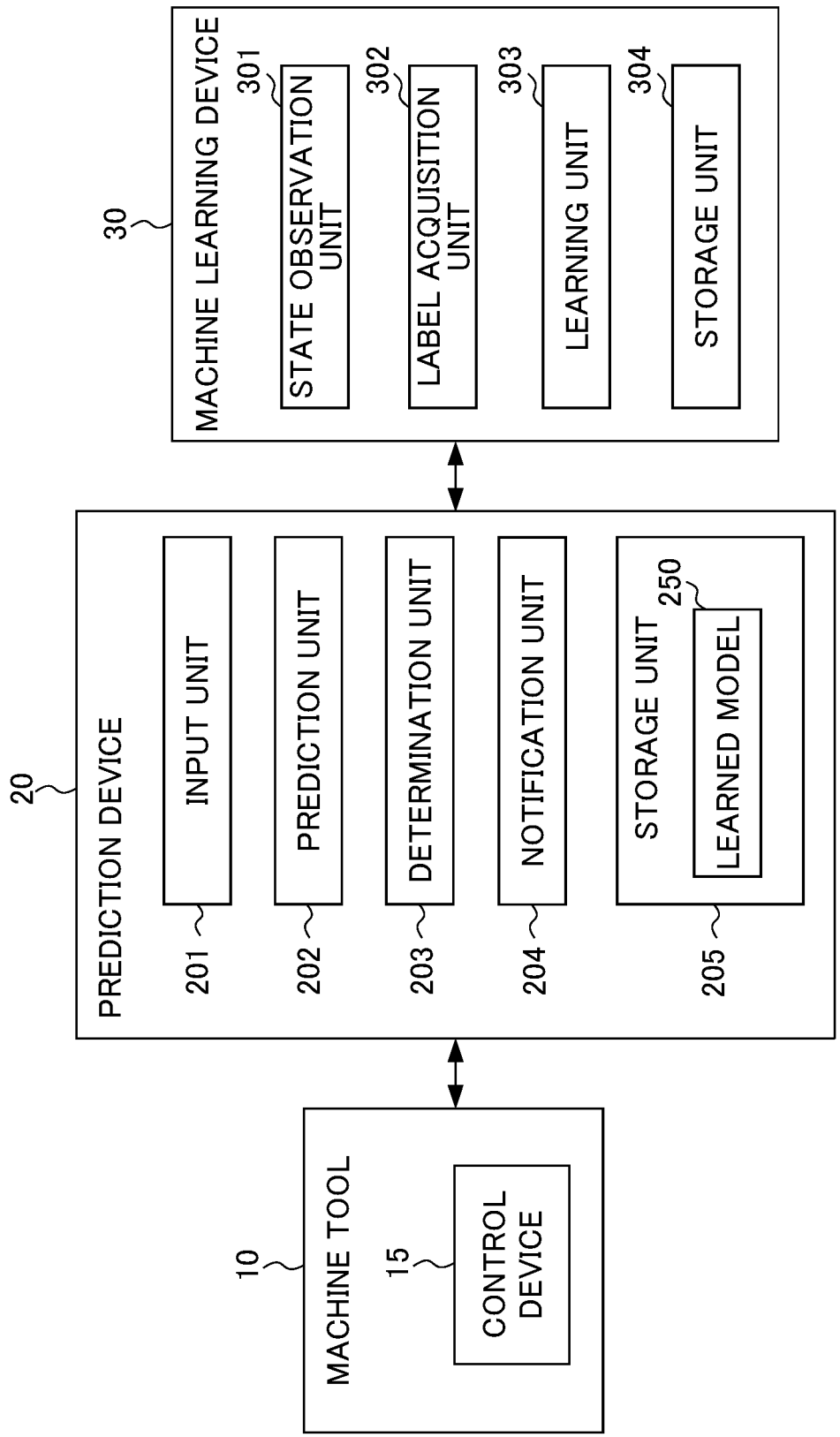
FIG. 1 is a functional block diagram showing a functional configuration example of a work system according to an embodiment.

FIG. 1 is a functional block diagram showing a functional configuration example of a work system according to an embodiment. As shown in FIG. 1, the work system 1 includes a machine tool 10, a prediction device 20, and a machine learning device 30.

The machine tool 10, the prediction device 20, and the machine learning device 30 may be directly connected to each other via a connection interface (not shown). Furthermore, the machine tool 10, the prediction device 20, and the machine learning device 30 may be connected to each other via a network (not shown) such as a local area network (LAN) (Local Area Network) and the Internet. In this case, the machine tool 10, the prediction device 20, and the machine learning device 30 are provided with a communication unit (not shown) for mutually communicating by such a connection. It should be noted that, as will be described later, the prediction device 20 may include the machine learning device 30. Furthermore, the machine tool 10 may include the prediction device 20 and the machine learning device 30.

The machine tool 10 is a machine tool known to those skilled in the art and incorporates a control device 15. The machine tool 10 operates based on an operation command of the control device 15, and operates the movable parts such as a tool by a manual handle (not shown) included in the machine tool 10 being operated. As will be described later, when the manual handle (not shown) is operated and manually fed, the machine tool 10 may also output the waveform of the pulse signal generated by the manual handle (not shown) to the prediction device 20 as a manual feed pulse waveform of manual feed state information while the manual feed is being performed via a communication unit (not shown) of the machine tool 10. Furthermore, the manual feed state information may include a distance to an interference object such as a workpiece or a table, user identification information of a user who performs the manual feed, a date and time when the manual feed is performed, and an axis number. Furthermore, the manual feed state information may include environmental conditions such as the temperature and humidity at the location where the machine tool 10 is installed.

It should be noted that that the information relating to the distance to the interference object (i.e., the position of the interfering object) may be stored in advance in a storage unit (not shown) such as ROM (Read Only Memory) included in the machine tool 10. Furthermore, the distance to the interference object affects, for example, the operation of the manual handle (not shown) by the user. For example, in a case in which the distance between the movable part and the interference object is large, the user rotates the manual handle (not shown) greatly (faster) to move the movable part greatly. Therefore, the manual handle (not shown) generates many pulse signals. On the other hand, in a case in which the distance between the movable part and the interference object is small, the user rotates the manual handle (not shown) slightly (slower) to move the movable part slightly. Therefore, the manual handle (not shown) generates a small number of pulse signals. Thus, since the distance to the interference object is closely related to the manual feed pulse waveform, the distance to the interfering object is included in the manual feed state information.

Furthermore, the operation of the manual handle (not shown) differs from user to user, and often differs greatly between when the movable part is moved greatly and when the movable part is moved slightly. Therefore, the user identification information is included in the manual feed state information in order to predict how the pulse waveform changes, by learning the pulse waveform for each user in the machine learning device 30 to be described later.

Furthermore, the axis number indicates, for example, the X-axis, the Y-axis, and the Z-axis which are the moving directions of the movable part.

The control device 15 is a numerical control device known to those skilled in the art, and generates an operation command based on the control information and transmits the generated operation command to the machine tool 10. Thus, the control device 15 controls the operation of the machine tool 10. It should be noted that the control device 15 may output the manual feed state information to the prediction device 20 in place of the machine tool 10, via the communication unit of the machine tool 10 (not shown).

The control device 15 may also be a device independent of the machine tool 10.

When the manual feed is performed in the machine tool 10 in the operation phase, the prediction device 20 acquires the manual feed state information currently being performed from the machine tool 10. The prediction device 20 inputs the acquired manual feed state information to the learned model provided from the machine learning device 30 to be described later, whereby the moving distance of the movable part of the machine tool 10 after a predetermined time from the present time can be predicted.

Figure 2A:
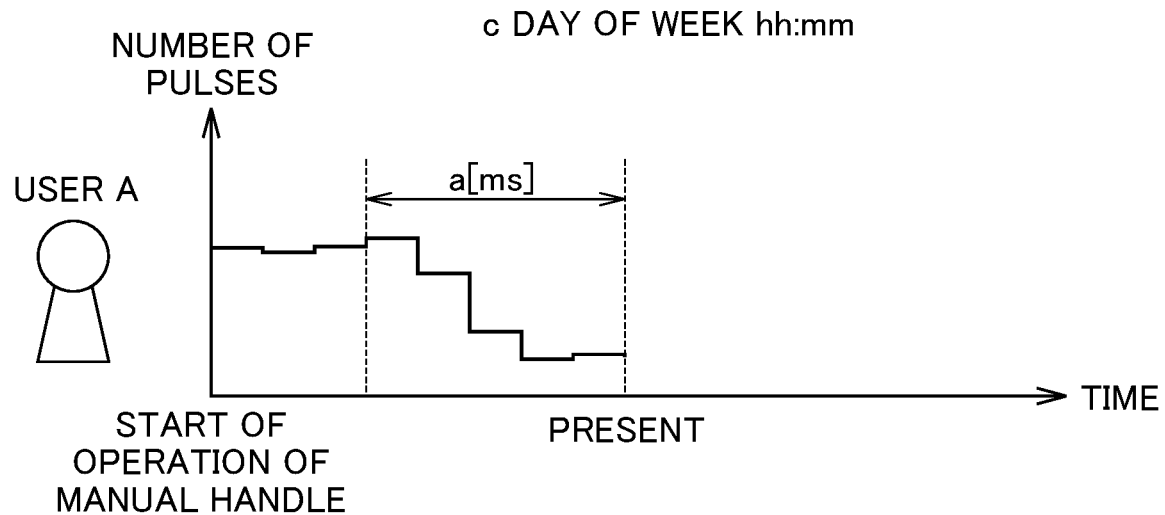
FIG. 2A is a diagram showing an example explaining prediction processing of a prediction device.
Figure 2B:
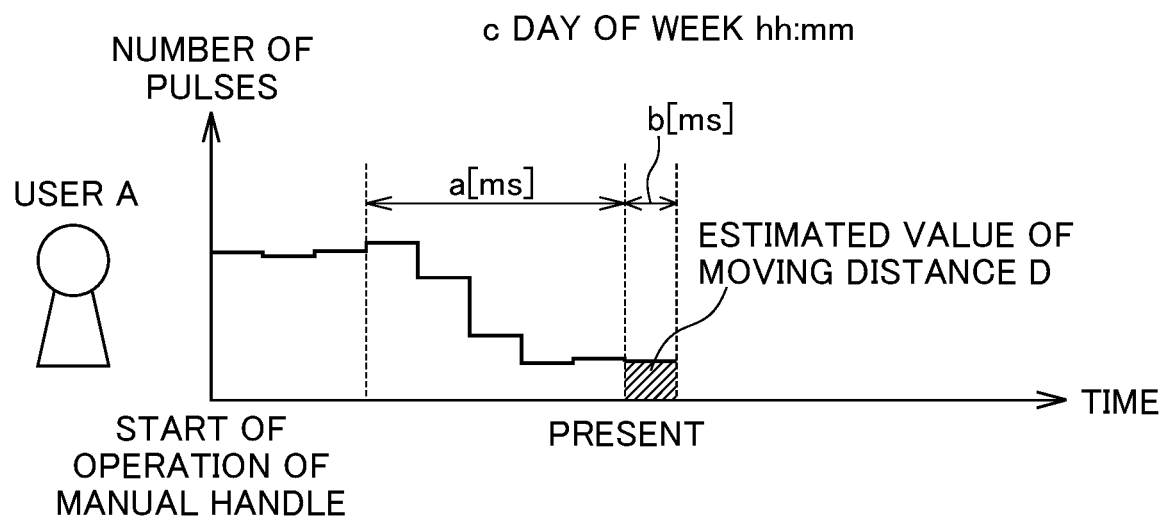
FIG. 2B is a diagram showing an example explaining prediction processing of a prediction device.

More specifically, as shown in FIG. 2A, for example, when the user A operates the movable part in the X-axis (e.g., axis number "1" or the like) of the machine tool 10 by the manual handle (not shown) from the time hh: mm of the c day of the week, the prediction device 20 predicts the distance D in which the movable part moves from the present time to b [ms], as shown in FIG. 2B, based on the manual feed pulse waveform from the present time to the time before a [ms] and the distance s [mm] from the present position to the interference object.

Therefore, in order for the prediction device 20 to predict the distance D, the machine learning device 30 to be described later uses at least the manual feed pulse waveform of the time of a [ms] as input data, and acquires, as label data, the distance by which the movable part of the machine tool 10 moved in the time of b [ms] from the time immediately after the waveform being outputted, and adopts the data as training data.

Before describing the prediction device 20, machine learning for generating a learned model will be described.

Machine Learning Device 30

For example, the machine learning device 30 acquires in advance, as input data, a manual feed pulse waveform at the time of a manual feed operation in any manual feed operation performed by the machine tool 10, a distance to an interference object at the time of the manual feed operation, user identification information of a user who performed the manual feed operation, a date and time when the manual feed operation was performed, and manual feed state information including an axis number operated in the manual feed operation.

Furthermore, the machine learning device 30 acquires, as a label (correct answer), data indicating the distance by which the movable part of the machine tool 10 moved within a predetermined time from immediately after the manual feed pulse waveform in the acquired input data.

The machine learning device 30 performs supervised learning using training data which is a set of the label and the acquired input data, and constructs a learned model to be described later.

By doing so, it is possible for the machine learning device 30 to provide the constructed learned model to the prediction device 20.

The machine learning device 30 will be described in detail.

As shown in FIG. 1, the machine learning device 30 includes a state observation unit 301, a label acquisition unit 302, a learning unit 303, and a storage unit 304.

In the learning phase, the state observation unit 301 acquires from the machine tool 10 via the communication unit (not shown), as input data, the manual feed state information including the manual feed pulse waveform at the time of the manual feed operation in any manual feed operation performed by the machine tool 10, the distance to the interference object at the time of the manual feed operation, the user identification information of the user who performed the manual feed operation, the date and time when the manual feed operation was performed, and the axis number operated in the manual feed operation.

Figure 3:
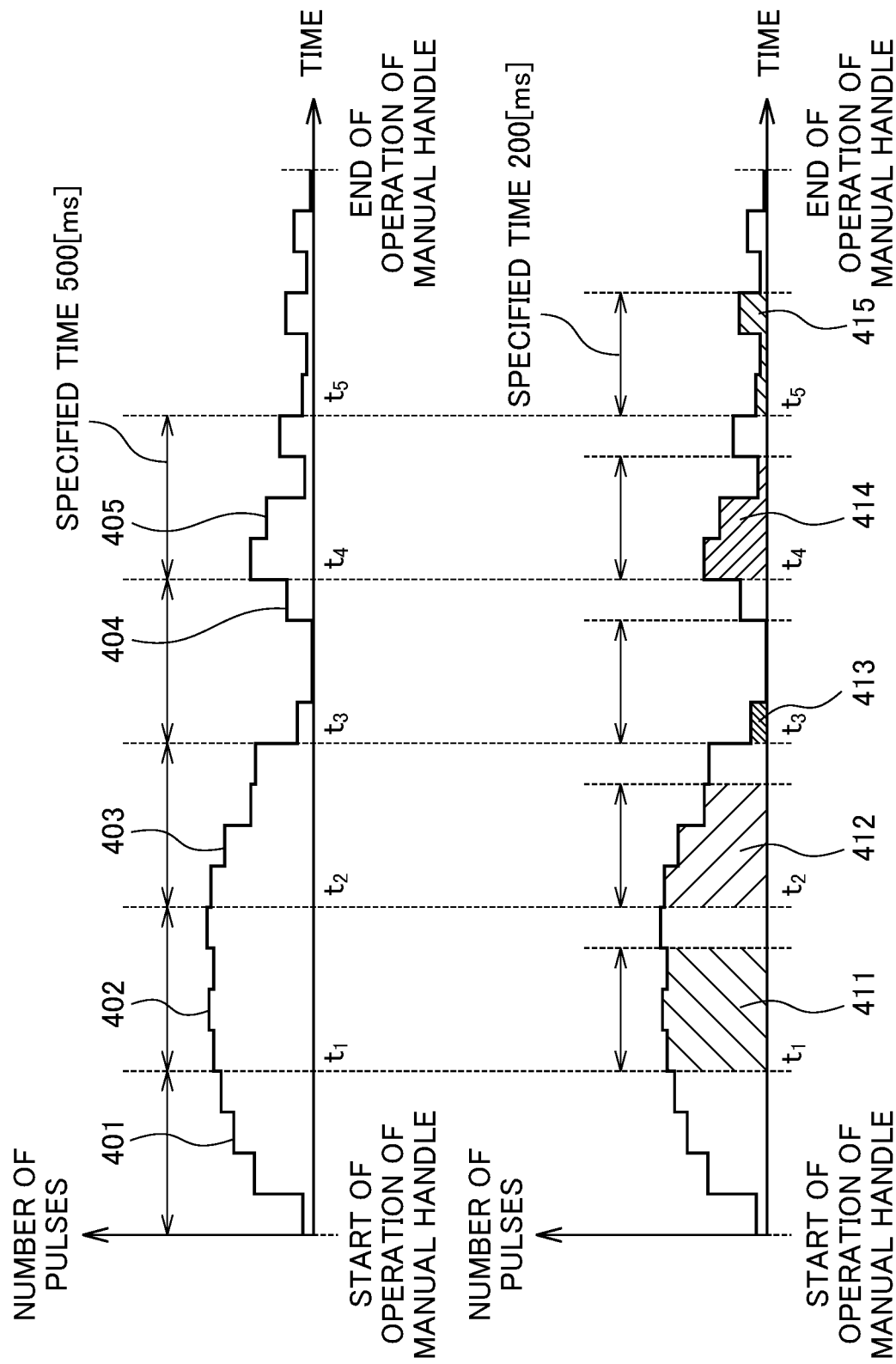
FIG. 3 is a diagram showing an example of a manual feed pulse waveform in one manual feed operation from the start to the end of a manual handle operation.

FIG. 3 is a diagram showing an example of a manual feed pulse waveform in one manual feed operation from the start to the end of a manual handle (not shown) operation. It should be noted that the manual feed pulse waveforms shown in the upper and lower stages of FIG. 3 are the same.

As shown in the upper stage of FIG. 3, the state observation unit 301, for example, divides the manual feed pulse waveform from the start to the end of the manual handle (not shown) operation at every specified time (corresponding to a [ms] in FIG. 2A) such as 500 ms, to generate divided manual feed pulse waveforms 401 to 405. The state observation unit 301 acquires, as input data, the generated manual feed pulse waveforms 401 to 405 together with the distance to the interference object at the time of the manual feed operation in FIG. 3 of the manual feed state information, the user identification information of the user who performed the manual feed operation in FIG. 3, the date and time when the manual feed operation in FIG. 3 was performed, and the axis number operated in the manual feed operation in FIG. 3. The state observation unit 301 stores the acquired input data in the storage unit 304.

It should be noted that the specified time is not limited to 500 ms, and may be set to any time.

The label acquisition unit 302, for example, acquires, as label data (correct answer), data indicating the distance by which the movable part of the machine tool 10 moved within a predetermined time from immediately after each of the manual feed pulse waveforms 401 to 405 of the manual feed state information in the input data.

More specifically, as shown in the lower stage of FIG. 3, the label acquisition unit 302 acquires, for example, as label data (correct answer), the distance by which the movable part of the machine tool 10 moved within a specified time such as 200 ms (corresponding to b [ms] in FIG. 2B) from the times $t_1$ to $t_5$ immediately after the respective generated manual feed pulse waveforms 401 to 405 (e.g., the value of the time integration of the pulses of the areas 411 to 415) shown by hatching. The label acquisition unit 302 stores the acquired label data in the storage unit 304.

It should be noted that the specified time is not limited to 200 ms, and may be set to any time shorter than at least the specified time of the divided manual feed pulse waveforms 401 to 405.

The learning unit 303 receives the abovementioned set of the input data and the label as training data. The learning unit 303 performs supervised learning using the received training data, thereby constructing a learned model 250 for predicting the moving distance of the movable part of the machine tool 10.

The learning unit 303 provides the constructed learned model 250 to the prediction device 20.

It should be noted that it is preferable to prepare a number of pieces of training data for performing supervised learning. For example, training data may be acquired from machine tools 10 at various locations that are actually operating in a customer's factory or the like.

Figure 4:
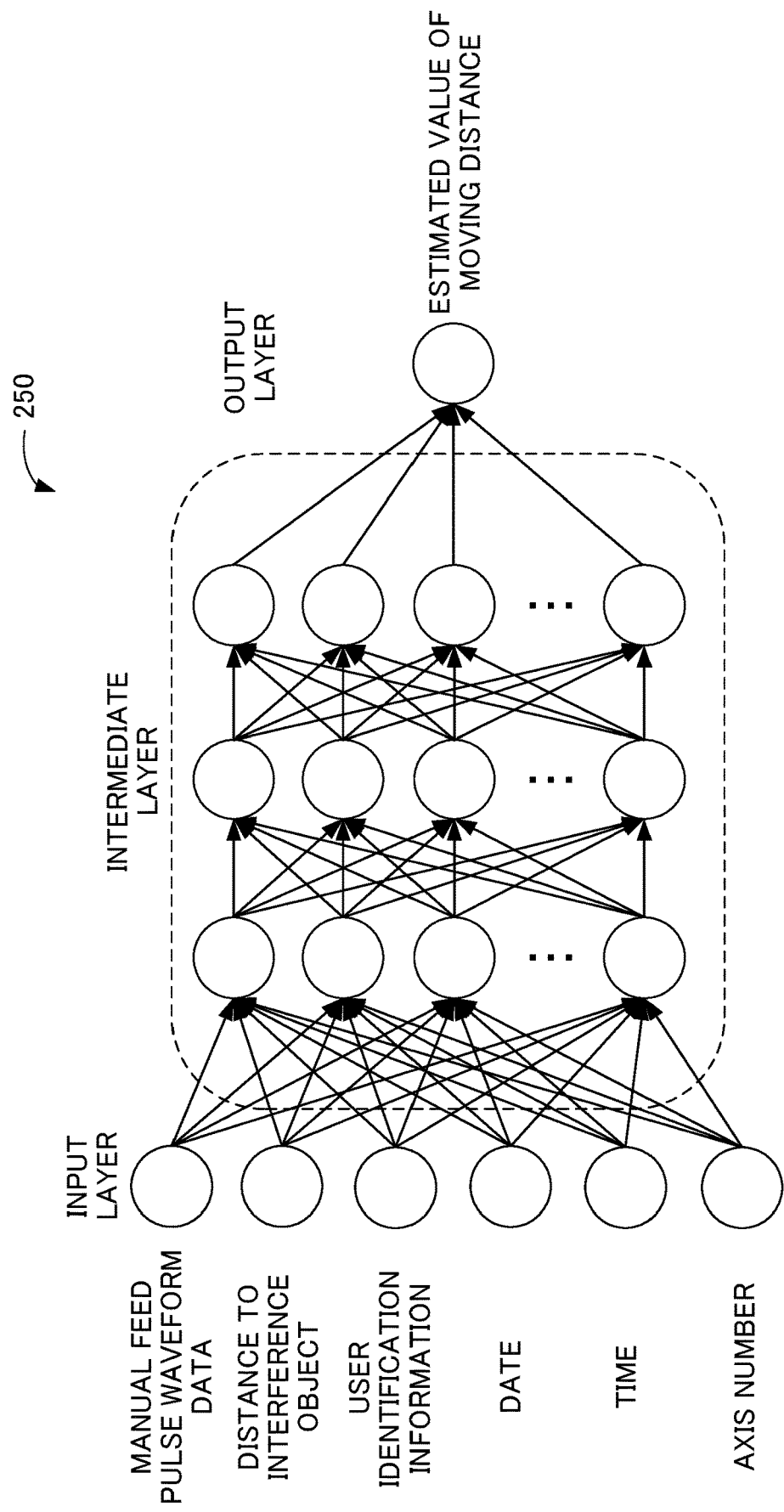
FIG. 4 is a diagram showing an example of a learned model provided to the prediction device of FIG. 1.

FIG. 4 is a diagram showing an example of the learned model 250 provided to the prediction device 20 of FIG. 1. Here, as shown in FIG. 4, the learned model 250 exemplifies a multi-layer neural network in which the manual feed state information of the manual feed currently performed in the machine tool 10 is used as input layers, and the estimated value of the moving distance of the movable part of the machine tool 10 after a predetermined time (for example, 200 ms, etc.) from the present time by the manual feed state information is used as the output layer.

Here, the manual feed state information of a currently performed manual feed includes the manual feed pulse waveform in the manual feed operation, the distance to the interference object at the time of the manual feed operation, the user identification information of the user performing the manual feed operation, the date and time when the manual feed operation was performed, and the axis number operated in the manual feed operation.

It should be noted that the manual feed state information of a currently performed manual feed may include environmental conditions such as temperature and humidity where the machine tool 10 is installed.

Furthermore, in a case in which new training data are acquired after the learned model 250 is constructed, the learning unit 303 may further perform supervised learning for the learned model 250 to update the learned model 250 that has been constructed.

By doing so, training data can be automatically acquired from the operation of a manual handle (not shown) by a normal user, and thus, it is possible to increase the accuracy of prediction routinely.

The supervised learning may be performed by online learning. Moreover, the supervised learning may be performed by batch learning. Furthermore, the supervised learning may be performed by mini-batch learning.

Online learning refers to a learning method in which the manual feed is performed in the machine tool 10, and supervised learning is immediately performed every time training data is generated. Batch learning refers to a learning method in which, while the manual feed is performed in the machine tool 10 and training data is generated repeatedly, a plurality of pieces of training data corresponding to the repetition are collected, and supervised learning is performed using all the collected training data. Furthermore, mini-batch learning refers to a learning method which is an intermediate method between the online learning and the batch learning and in which supervised learning is performed whenever a certain amount of training data is collected.

The storage unit 304 is RAM (Random Access Memory) or the like, and stores input data acquired by the state observation unit 301, the label data acquired by the label acquisition unit 302, the learned model 250 constructed by the learning unit 303, and the like.

The machine learning for generating the learned model 250 included in the prediction device 20 has been explained above.

Next, an explanation will be made of the prediction device 20 in the operation phase.

Prediction Device 20 in Operation Phase

As shown in FIG. 1, the prediction device 20 in the operation phase includes an input unit 201, a prediction unit 202, a determination unit 203, a notification unit 204, and a storage unit 205.

It should be noted that the prediction device 20 includes an arithmetic processing unit (not shown) such as a central processing unit (CPU) in order to realize the operation of the functional blocks shown FIG. 1. Furthermore, the prediction device 20 includes an auxiliary storage device (not shown) such as read only memory (ROM) or a hard disk drive (HDD) storing various control programs, and a main storage device (not shown) such as RAM for storing data required temporarily for the arithmetic processing unit to execute programs.

Furthermore, in the prediction device 20, the arithmetic processing unit reads the OS and application software from the auxiliary storage device, and executes arithmetic processing based on this OS and application software, while deploying the read OS and application software to the main storage device. The prediction device 20 controls each hardware component on the basis of the arithmetic processing result. In this way, the processing of the functional blocks shown in FIG. 1 are realized. That is, the prediction device 20 can be realized by the cooperation of hardware and software.

The input unit 201 inputs from the machine tool 10 the manual feed state information of the manual feed currently performed in the machine tool 10. The input unit 201 outputs the inputted manual feed state information to the prediction unit 202.

The prediction unit 202 inputs the manual feed state information inputted by the input unit 201 into the learned model 250 of FIG. 3, and predicts the moving distance of the movable part of the machine tool 10 after a predetermined time from present.

Figure 5A:
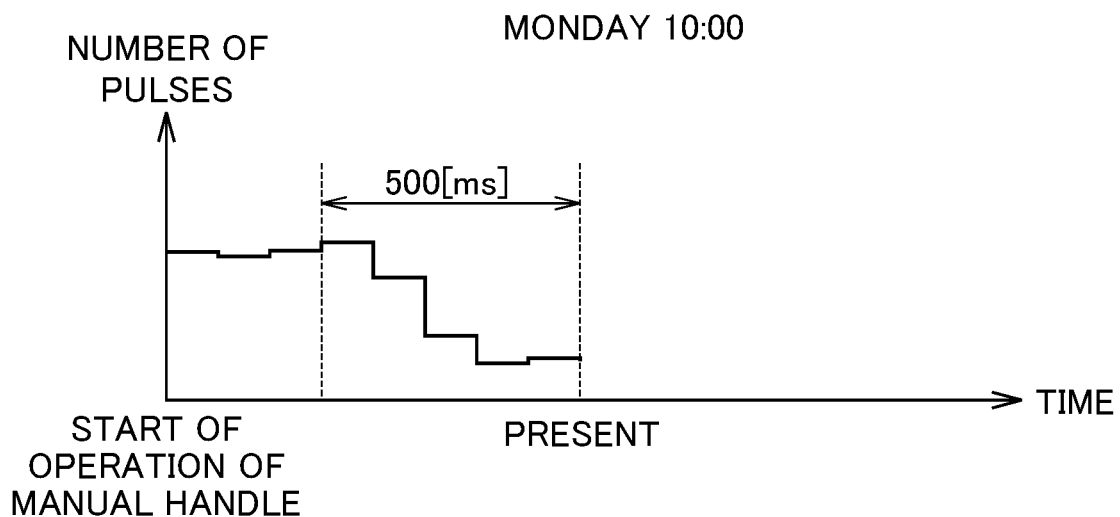
FIG. 5A is a diagram showing an example of prediction processing of a prediction unit.
Figure 5B:
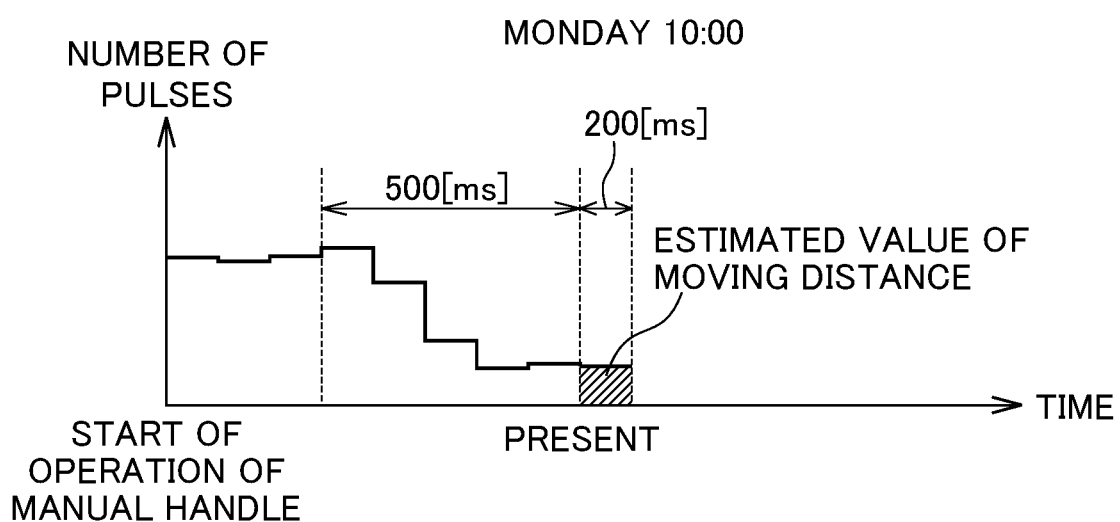
FIG. 5B is a diagram showing an example of the prediction processing of the prediction unit.

FIG. 5A and FIG. 5B are diagrams each showing an example of the prediction processing of the prediction unit 202. It should be noted that the pulse waveforms shown in FIGS. 5A and 5B are examples of the manual feed pulse waveforms acquired from the machine tool 10 in a case in which the user of the machine tool 10 operates the X-axis (e.g., the axis number "1" or the like) by the manual handle (not shown) from the time 10:00 of Monday.

As shown in FIG. 5A, the prediction unit 202 inputs to the learned model 250 of FIG. 3 the manual feed pulse waveform from the present time to before 500 ms, together with the distance to the interference object at the time of the manual feed operation currently being performed, the user identification information of the user performing the manual feed operation, the date and time when the manual feed operation is being performed, and the axis number "1" being operated in the manual feed operation, among the acquired manual feed pulse waveform. As shown in FIG. 5B, the prediction unit 202 predicts the moving distance of the movable part of the machine tool 10 at the time after 200 ms from the present time.

It should be noted that the length of the time of the manual feed pulse waveform inputted to the learned model 250 may correspond to the time interval of the manual feed pulse waveform of the input data used for generating the learned model 250, i.e. 500 ms. The estimated value of the moving distance outputted by the learned model 250 may correspond to the time taken by the movable part of the machine tool 10 to move the distance of the label data used to generate the learned model 250, i.e. 200 ms.

Furthermore, the prediction unit 202 may predict the estimated value of the moving distance in the prediction cycle of the time interval such as 10 ms and 50 ms. Thus, it is possible for the machine tool 10 to avoid a collision in manual feed.

The determination unit 203 determines whether or not the movable part of the machine tool 10 will collide with the interference object, based on the estimated value of the moving distance predicted by the prediction unit 202 for each prediction cycle and the distance to the interference object.

More specifically, in a case in which the estimated value of the moving distance is shorter than the distance to the interference object, the determination unit 203 determines that a collision will not occur, thereby determining that the operation of the manual feed continues without generating an alarm.

On the other hand, in a case in which the estimated value of the moving distance is equal to or greater than the distance to the interference object, the determination unit 203 determines that the collision will occur, thereby generating an alarm and stopping the operation of the manual feed.

In so doing, the prediction device 20 performs the interference check based on the estimated value of the moving distance predicted using the learned model 250, and thus, a prediction close to the user's operation can be performed and the frequency of the alarm can be reduced.

In a case in which the determination unit 203 determines that a collision will occur, the notification unit 204 may output an alarm and an operation stop to an output device (not shown) such as a liquid crystal display included in the machine tool 10 and/or the control device 15. It should be noted that the notification unit 204 may be notified by voice through a speaker (not shown).

The storage unit 205 is, for example, ROM, an HDD or the like, and may store the learned model 250 together with various control programs.

Prediction Processing of Prediction Device 20 in Operation Phase

Next, an explanation will be made of an operation related to prediction processing of the prediction device 20 according to the present embodiment.

Figure 6:
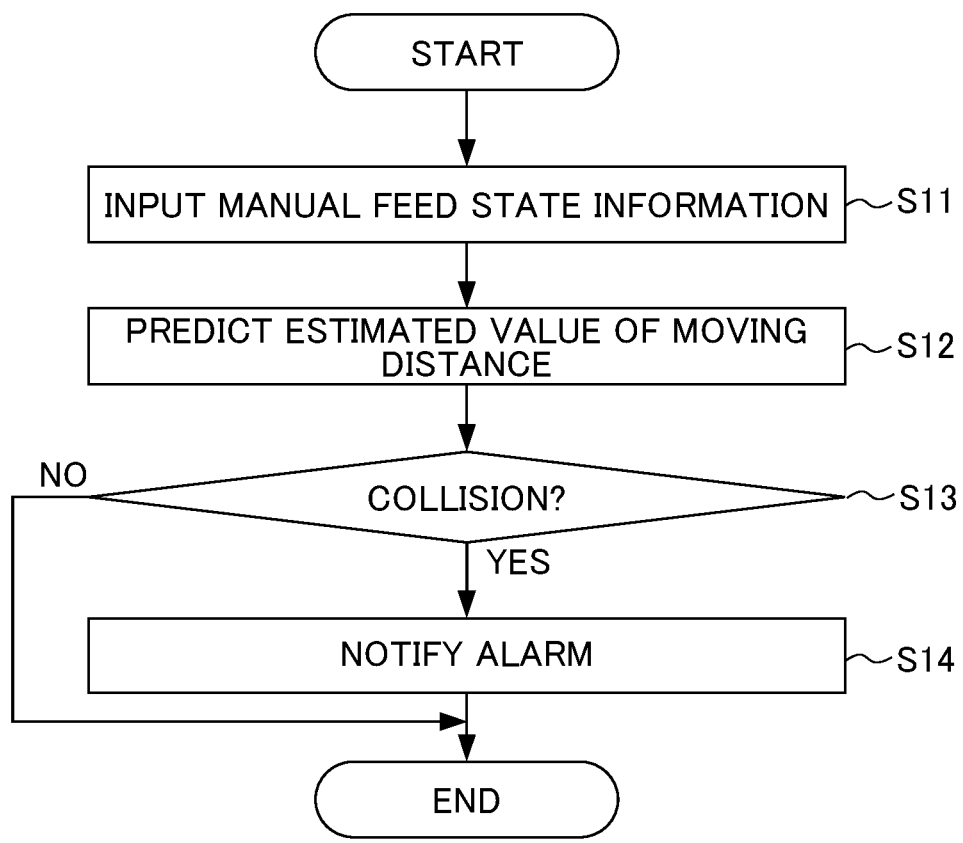
FIG. 6 is a flowchart explaining prediction processing of the prediction device in an operation phase.

FIG. 6 is a flowchart for explaining the prediction processing of the prediction device 20 in the operation phase. The flow shown here is repeatedly executed for each prediction cycle.

In Step S11, the input unit 201 inputs from the machine tool 10 the manual feed state information of the manual feed currently performed in the machine tool 10.

In Step S12, the prediction unit 202 inputs the manual feed state information of the manual feed currently being performed, which was inputted in Step S11, into the learned model 250 to predict an estimated value of the moving distance of the movable part of the machine tool 10.

In Step S13, the determination unit 203 determines whether or not the movable part of the machine tool 10 will collide with the interference object based on the comparison between the estimated value of the moving distance predicted in Step S12 and the distance to the interference object. In a case in which it is determined that a collision will occur, the processing advances to Step S14, and in a case in which it is determined that no collision occur, the processing ends.

In Step S14, the notification unit 204 notifies the alarm and the operation stop determined in Step S13.

Thus, it is possible for the prediction device 20 according to the embodiment to input the manual feed state information of the manual feed currently performed in the machine tool 10 to the learned model 250, and predict an estimated value of the moving distance of the movable part of the machine tool 10. Furthermore, it is possible for the prediction device 20 to detect in advance whether or not the movable part will collide with the interference object based on the comparison between the estimated value of the predicted moving distance and the distance to the interference object.

That is, since the prediction device 20 performs the interference check based on the estimated value of the moving distance predicted using the learned model 250, the prediction close to the user's operation can be made, and thus, it is possible to prevent the collision of the movable part without excessively generating an alarm in the manual feed.

Although an embodiment has been described above, the prediction device 20 and the machine learning device 30 are not limited to the above-described embodiment, and include modifications, improvements, and the like of a scope that can achieve an object of the present invention.

Modification Example 1

In the above embodiment, the machine learning device 30 is exemplified as a device different from the machine tool 10, the control device 15, and the prediction device 20. However, it may be configured so that the machine tool 10, the control device 15, or the prediction device 20 includes some or all of the functions of the machine learning device 30.

Modification Example 2

Furthermore, for example, in the above-described embodiment above, the prediction device 20 is exemplified as a device different from the machine tool 10 and the control device 15. However, it may be configured so that the machine tool 10 or the control device 15 may include some or all of the functions of the prediction device 20.

Alternatively, a server, for example, may include some or all of the input unit 201, the prediction unit 202, the determination unit 203, the notification unit 204, and the storage unit 205 of the prediction device 20. Moreover, the functions of the prediction device 20 may be realized using a virtual server function or the like on the cloud.

Furthermore, the prediction device 20 may be a distributed processing system in which the functions of the prediction device 20 are distributed appropriately to a plurality of servers.

Modification Example 3

Figure 7:
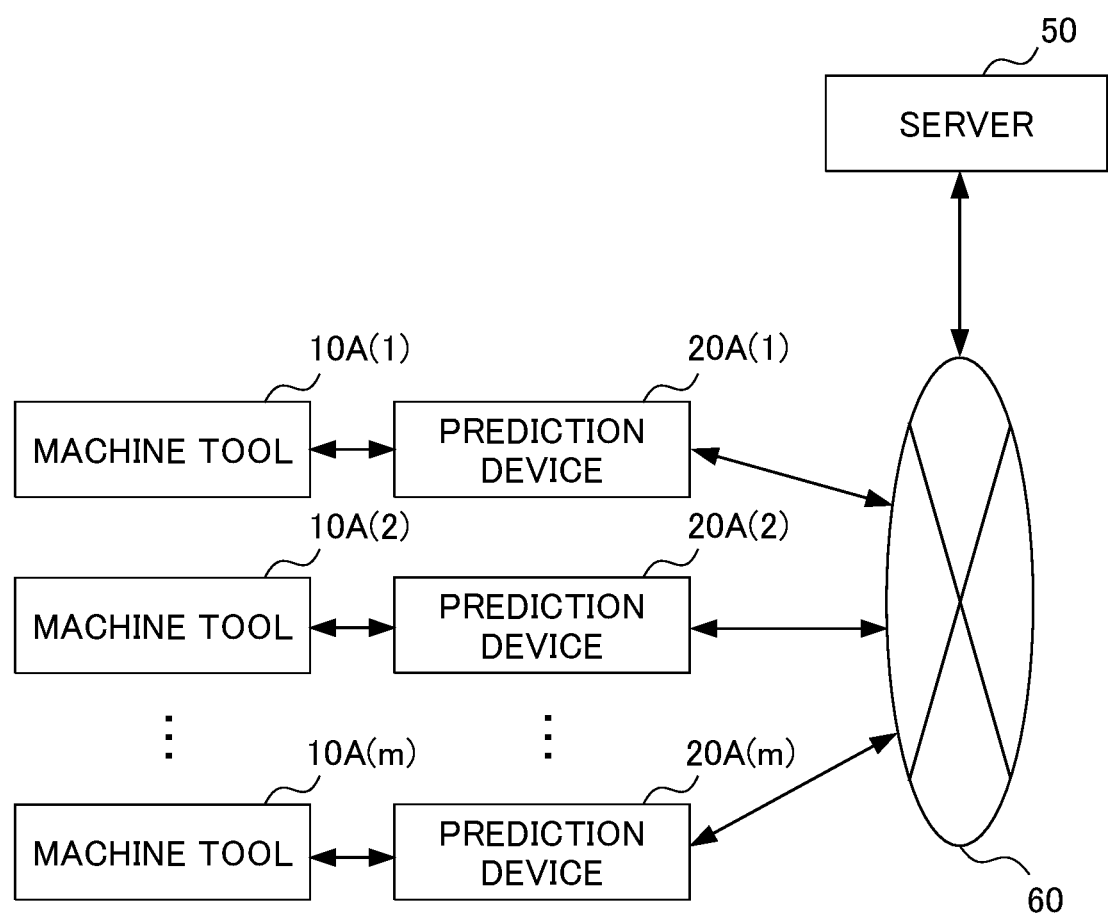
FIG. 7 is a diagram showing an example of the configuration of a work system.

Furthermore, for example, in the above-described embodiment, the prediction device 20 predicts an estimated value of the moving distance of the movable part of the machine tool 10 from the manual feed state information of the currently performed manual feed acquired from one machine tool 10 using the learned model 250 provided from the machine learning device 30. However, the present invention is not limited thereto. For example, as shown in FIG. 7, the server 50 may store the learned model 250 generated by the machine learning device 30, and share the learned model 250 with m-number of prediction devices 20A(1) to 20A(m) connected to the network 60 (m is an integer equal to or greater than 2). In this way, it is possible to adopt the learned model 250 even when a new machine tool and a new prediction device are installed.

It should be noted that the prediction devices 20A(1) to 20A(m) are respectively connected to the machine tools 10A(1) to 10A(m).

Furthermore, each of the machine tools 10A(1) to 10A(m) corresponds to the machine tool 10 of FIG. 1, and they are machine tools of the same model to each other. Each of the prediction devices 20A(1) to 20A(m) corresponds to the prediction device 20 of FIG. 1.

Figure 8:
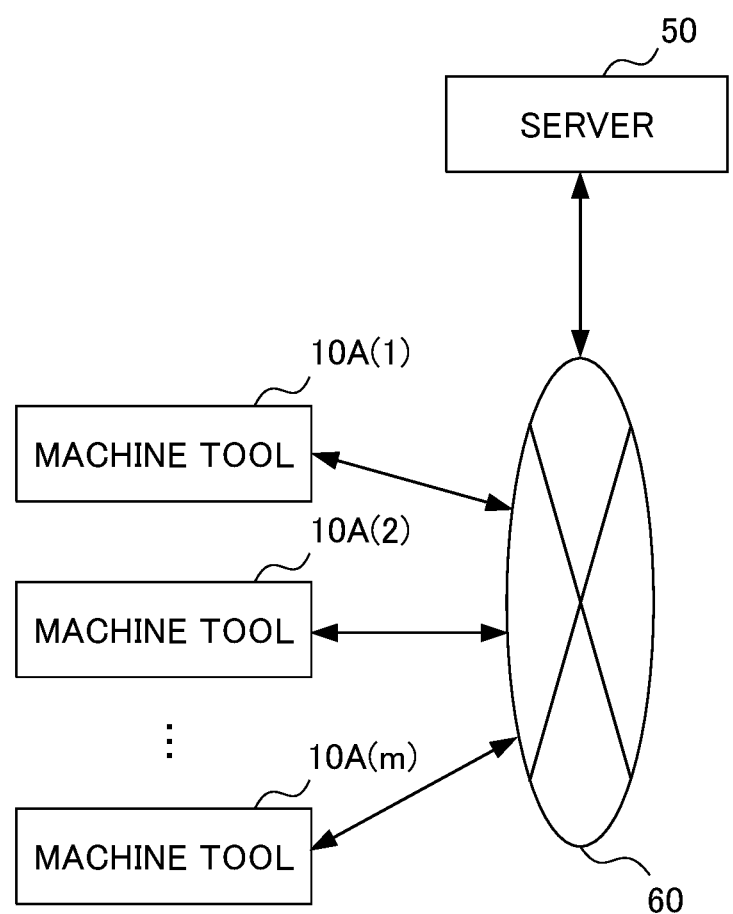
FIG. 8 is a diagram showing an example of the configuration of the work system.

Alternatively, as shown in FIG. 8, the server 50 may, for example, operate as the prediction device 20, and predict an estimated value of the moving distance of the movable part from the manual feed state information of the manual feed currently performed for each of the machines 10A(1) to 10A(m) connected to the network 60. This allows the learned model 250 to be adopted even when a new machine tool is installed.

It should be noted that, in a case in which the machine tools 10A(1) to 10A (m) are two or more different models, the machine learning device 30 may generate the learned model 250 for each model, and the server 50 may store the generated learned model 250 for each model.

Modification Example 4

Further, for example, in the above-described embodiment, while the machine tool 10 manually feeds the movable part according to the operation of the manual handle by the user (not shown), the prediction device 20 predicts an estimated value of the moving distance of the movable part of the machine tool 10 for each prediction cycle such as 50 ms. However, the present invention is not limited thereto. For example, in the machine tool 10, even if the operation of the manual handle is performed by the user (not shown), the movable part may be moved by delaying by the prediction cycle from the generation of the pulse signal. That is, it is possible for the prediction device 20 to prevent a collision by allowing the machine tool 10 to operate the movable part after confirming the correctness of the past prediction.

Figure 9A:
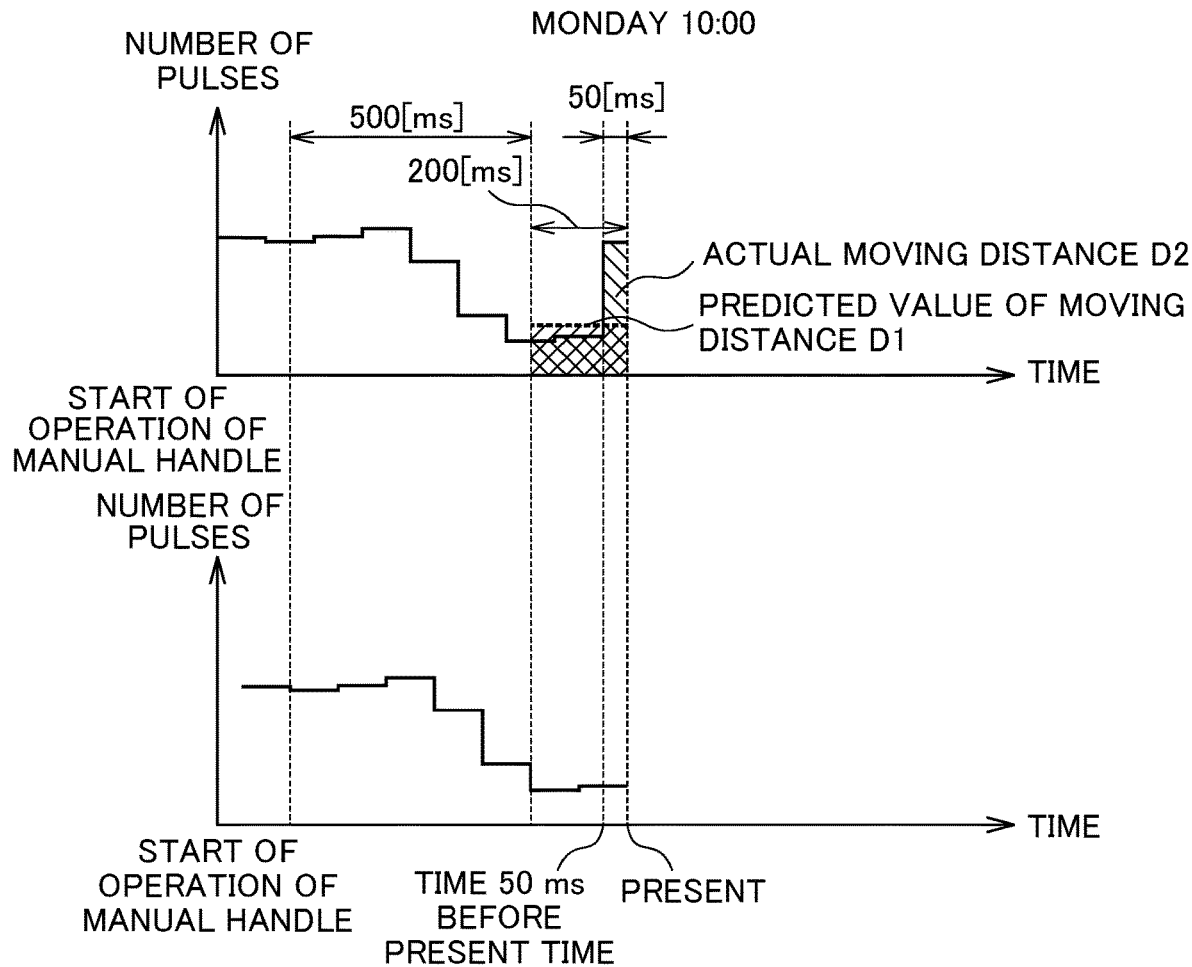
FIG. 9A is a diagram showing an example of a case of operating the movable part of the machine tool by delaying by a prediction cycle from the generation of the pulse signal.
Figure 9B:
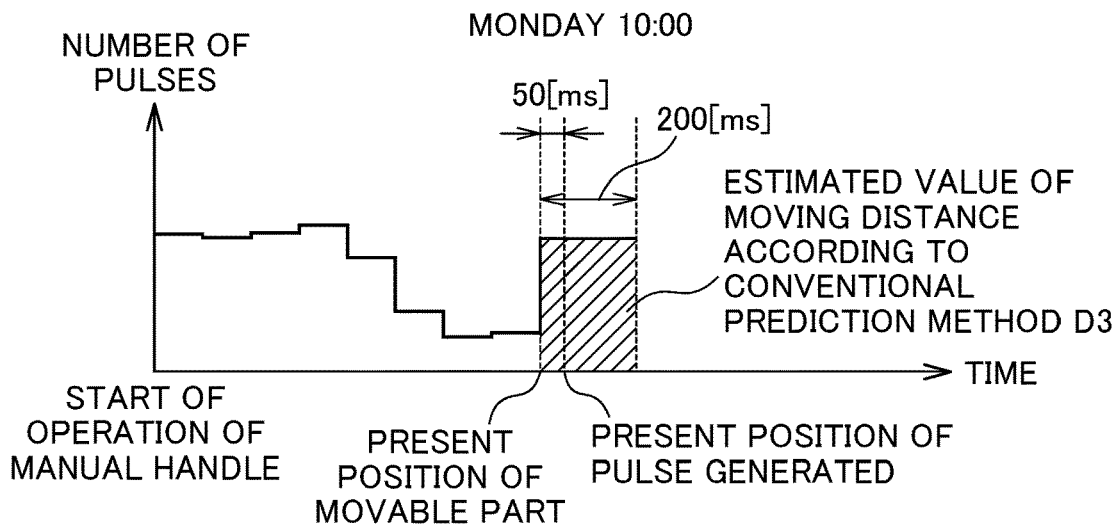
FIG. 9B is a diagram showing an example of a case of operating the movable part of the machine tool by delaying by a prediction cycle from the generation of the pulse signal.

FIGS. 9A and 9B are each a diagram showing an example of a case of operating the movable part of the machine tool 10 by delaying by the prediction cycle from the generation of the pulse signal. It should be noted that the pulse waveforms shown in FIGS. 9A and 9B are examples of the manual feed pulse waveforms acquired from the machine tool 10 in a case in which the user of the machine tool 10 operates the X-axis (e.g., the axis number "1" or the like) from the time 10:00 of Monday by the manual handle (not shown).

The upper stage of FIG. 9A shows, in a solid line, the manual feed pulse waveform acquired by the prediction device 20 from the machine tool 10 by the present time. On the other hand, the lower stage of FIG. 9A shows the manual feed pulse waveform in which the movable part of the machine tool 10 operated until the present time, that is, the manual feed pulse waveform delayed by the prediction cycle (50 ms) as compared with the pulse waveform of FIG. 9A.

More specifically, the determination unit 203 of the prediction device 20 may calculate the actual moving distance D2 of the movable part in the time period from the time 200 ms before the present time until the present time during which the estimated value D1 of the moving distance of the movable part at the present time is predicted, based on the time integration of the manual feed pulse waveform indicated by the solid line in the upper stage of the FIG. 9A. The determination unit 203 compares the calculated actual moving distance D2 with the estimated value D1 of the moving distance. In a case in which the estimated value D1 of the moving distance is equal to or greater than the actual moving distance D2, the determination unit 203 may determine that the estimated value D1 of the moving distance is correct, and may determine whether or not the movable part of the machine tool 10 will collide with the interference object based on the estimated value D1 of the moving distance and the distance to the interference object.

On the other hand, in a case in which the estimated value D1 of the moving distance is smaller than the actual moving distance D2, the determination unit 203 determines that the estimated value D1 of the moving distance is erroneous. In this case, as shown in FIG. 9B, the determination unit 203 may determine whether or not the movable part of the machine tool 10 will collide with the interference object based on the estimated value D3 of the moving distance shown by hatching and the distance to the interference object which are predicted by a conventional prediction method which assumes that the present pulse waveform continues to remain constant or the like.

Modification Example 5

For example, in the above-described embodiment, the learned model 250 is generated in advance with the manual feed pulse waveform at the time of the manual feed operation in any manual feed operation performed by the machine tool 10, the distance to the interference object at the time of the manual feed operation, the user identification information of the user who performed the manual feed operation, the date and time when the manual feed operation was performed, and the axis number operated by the manual feed operation as input data. However, the present invention is not limited thereto. For example, the machine learning device 30 may generate the learned model 250 for each user identification information, for each day of the week when the manual feed operation was performed, for each time zone when the manual feed operation was performed, or each axis number, instead of inputting the training data for the user identification information, the date and time when the manual feed operation is performed, and the axis number. For example, by the learned model 250 being generated for each user identification information, it is possible for the prediction device 20 to accurately predict the estimated value of the moving distance of the movable part of the machine tool 10 in consideration of the habit of operation of the manual handle (not shown) of the machine tool 10 for each user.

Modification Example 6

Furthermore, in the above-described embodiment as shown in FIG. 4, for example, by the manual feed state information of the manual feed currently performed being inputted, the learned model 250 outputted the estimated value of the moving distance of the movable part of the machine tool 10 after a predetermined time from the present time (e.g., 200 ms, etc.). However, the present invention is not limited thereto. For example, by the manual feed state information of the manual feed currently performed being inputted, the learned model 250 may output an estimated pulse waveform generated by a manual handle (not shown) of the machine tool 10 after a predetermined time (e.g., 200 ms, etc.) from the present time.

FIG. 10 is a diagram showing an example of a learned model 250A that outputs an estimated pulse waveform.

The learned model 250A of FIG. 10 exemplifies a multi-layer neural network in which the manual feed state information of the manual feed currently performed is used as input layers, and the estimated pulse waveform outputted by the manual handle (not shown) of the machine tool 10 after a predetermined time (e.g., 200 ms) from the present time is used as output layers.

In a case of predicting the estimated pulse waveform using the learned model 250A of FIG. 10, and operating the movable part after delaying the movable part by a prediction cycle from the generation of the pulse signal even if the machine tool 10 is operated by a manual handle (not shown) by the user, the prediction device 20 may cause the machine tool 10 to operate the movable part after checking whether the past prediction is correct or incorrect. In so doing, it is possible for the prediction device 20 to prevent the collision of the movable part of the machine tool 10.

Figure 11A:
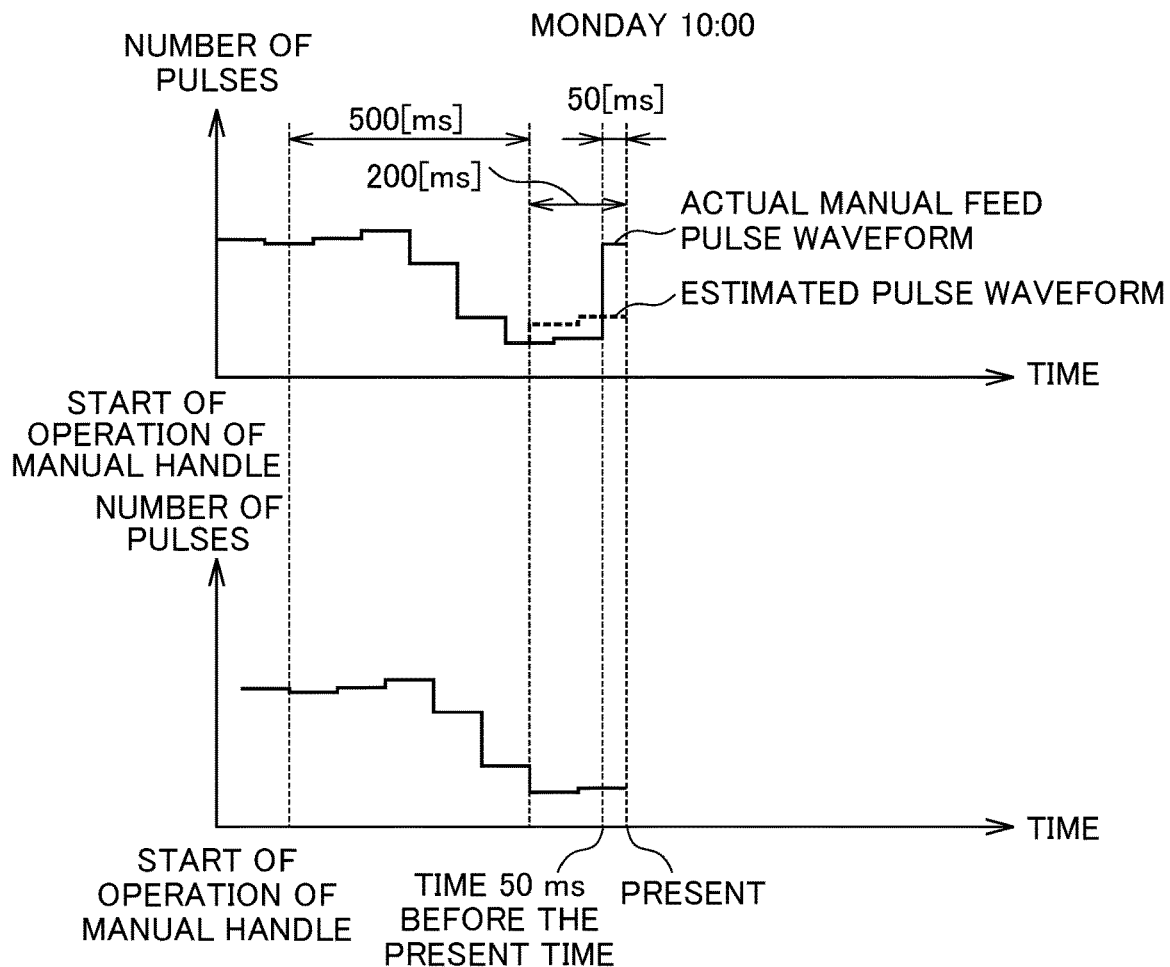
FIG. 11A is a diagram showing an example of a case of operating the movable part of the machine tool by delaying by a prediction cycle from the generation of the pulse signal.
Figure 11B:
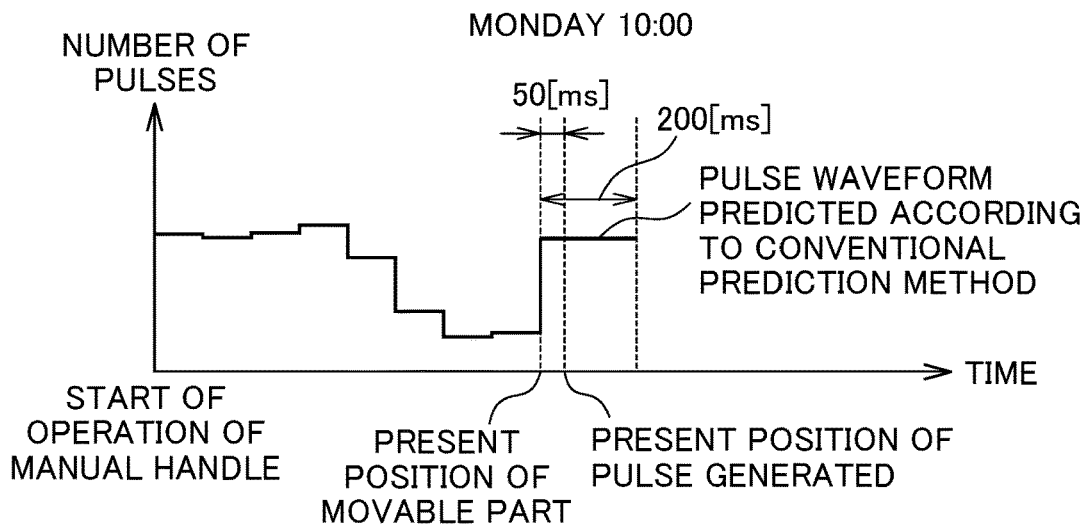
FIG. 11B is a diagram showing an example of a case of operating the movable part of the machine tool by delaying by a prediction cycle from the generation of the pulse signal.

FIGS. 11A and 11B are diagrams each showing an example of a case of operating the movable part of the machine tool 10 by delaying by a prediction cycle from the generation of the pulse signal. It should be noted that the pulse waveforms shown in FIGS. 11A and 11B are examples of manual feed pulse waveforms generated by the user of the machine tool 10 operating the X-axis (e.g., the axis number "1" or the like) from the time 10:00 of Monday by a manual handle (not shown).

The upper stage of FIG. 11A shows the manual feed pulse waveform acquired by the prediction device 20 from the machine tool 10 by the present time in a solid line. On the other hand, the lower stage of FIG. 11A shows the manual feed pulse waveform in which the movable part of the machine tool 10 was operated until the present time, that is, the manual feed pulse waveform delayed by the prediction cycle (50 ms) as compared with the pulse waveform of FIG. 11A.

Specifically, the determination unit 203 of the prediction device 20 compares, for example, the estimated pulse waveform indicated by a broken line, which is predicted at the time 200 ms before the present time, with the actual manual feed pulse waveform indicated by a solid line, as shown in the upper stage of FIG. 11A. In a case in which the actual manual feed pulse waveform does not exceed the estimated pulse waveform, the determination unit 203 may determine whether or not the movable part of the machine tool 10 will collide with the interference object based on the estimated value of the moving distance of the movable part predicted from the estimated pulse waveform and the distance to the interfering object.

On the other hand, in a case in which the actual manual feed pulse waveform may exceed the estimated pulse waveform, the determination unit 203 estimates the pulse waveform based on a conventional prediction method in which the present pulse waveform continues to remain constant or the like, as shown in FIG. 11B. The determination unit 203 may determine whether or not the movable part of the machine tool 10 will collide with the interference object based on the estimated value of the moving distance calculated from the estimated pulse waveform and the distance to the interfering object.

It should be noted that, in one embodiment, each function included in the prediction device 20 and the machine learning device 30 may be realized by hardware, software, or a combination thereof. Herein, being realized by software indicates being realized by a computer reading and executing a program.

Each component included in the prediction device 20 and the machine learning device 30 may be implemented by hardware including electronic circuits, or the like, software, or a combination thereof. If implemented by software, the programs constituting this software are installed to the computer. In addition, these programs may also be recorded on removable media and distributed to the user or downloaded to the user's computer over a network. Furthermore, when configured by hardware, a part or all of the functions of each component included in the above-described devices can be constituted by an integrated circuit (IC) such as, for example, a ASIC (Application Specific Integrated Circuit), a gate array, an FPGA (Field Programmable Gate Array), a CPLD (Complex Programmable Logic Device), or the like.

The programs can be stored on any of various types of non-transitory computer readable media and provided to a computer. The non-transitory computer readable media include various types of tangible storage media. Examples of the non-transitory computer readable media include a magnetic recording medium (for example, a flexible disk, a magnetic tape, and a hard disk drive), a magneto-optical recording medium (for example, a magneto-optical disk), CD-ROM (Read Only Memory), CD-R, CD-R/W, semiconductor memory (for example, mask ROM, PROM (Programmable ROM), EPROM (Erasable PROM), flash ROM, and RAM (Random Access Memory)). The programs may be provided to a computer using any of various types of transitory computer readable media. Examples of the transitory computer readable media include electric signals, optical signals, and electromagnetic waves. A transitory computer readable medium can provide programs to a computer through a wired communication path such as an electrical cable, an optical fiber, or the like, or through a wireless communication path.

It should be noted that the step of writing programs to be recorded on a recording medium includes processing that is performed in a time series manner according to the order and processing that is performed in a parallel or independent manner, even if the processing is not necessarily performed in a time series manner.

In other words, the machine learning device, the prediction device, and the control device of the present disclosure can assume various embodiments having the following configurations.

(1) A machine learning device 30 according to the present disclosure includes: a state observation unit 301 that acquires, as input data, manual feed state information including a manual feed pulse waveform at a time of a manual feed operation in any manual feed operation performed in a machine tool capable of manual feed; a label acquisition unit 302 that acquires label data indicating a distance by which a movable part of the machine tool 10 moved within a predetermined time immediately after the manual feed pulse waveform of the manual feed state information included in the input data; and a learning unit 303 that executes supervised learning by using the input data acquired by the state observation unit 301 and the label data acquired by the label acquisition unit 302, generates a learned model 250.

According to the machine learning device 30, it is possible to generate the learned model 250 that predicts an estimated value of the moving distance of the movable part by the manual feed performed with respect to the machine tool 10.

(2) In the machine learning device 30 according to (1), the manual feed state information may include at least any one of a distance to an interference object at a time of the manual feed operation, user identification information of a user who performed the manual feed operation, a date and time when the manual feed operation was performed, and an axis number operated in the manual feed operation.

In doing so, it is possible for the machine learning device 30 to generate the learned model 250 that can more accurately predict the estimated value of the moving distance of the movable part by the manual feed.

(3) In the machine learning device 30 according to (1) or (2), the state observation unit 301 may acquire the input data for each model of the machine tool 10, the label acquisition unit 302 may acquire the label data for each model of the machine tool 10; and the learning unit 303 may generate a learned model 250 for each model of the machine tool 10 by using the input data and the label data for each model of the machine tool 10.

In doing so, it is possible for the machine learning device 30 to generate the learned model 250 that predicts an estimated value of the moving distance of the movable part according to the model of the machine tool 10.

(4) A prediction device 20 according to the present disclosure includes: a learned model 250 generated by the machine learning device 30 according to any one of (1) to (3); an input unit 201 that inputs the manual feed state information of manual feed currently performed with respect to a machine tool 10 capable of manual feed; and a prediction unit 202 that inputs the manual feed state information inputted by the input unit 201 to the learned model 250 and predicts a moving distance of a movable part of the machine tool 10 after a predetermined time from a present time based on the manual feed state information.

According to this prediction device 20, it is possible to prevent the collision of the movable part of the machine tool 10 without excessively generating an alarm in the manual feed.

(5) In the prediction device (20) according to (4), the prediction unit 202 may cyclically predict the moving distance at a shorter time interval than the predetermined time.

In so doing, it is possible for the prediction device 20 to prevent the collision of the movable part of the machine tool 10 with high accuracy.

(6) In the prediction device 20 according to (4) or (5), the learned model 250 may be included in a server 50 that is accessibly connected via a network 60 from the prediction device 20.

In so doing, it is possible for the prediction device 20 to adopt the learned model 250 even if a new machine tool 10, a new control device 15, and a new prediction device 20 are installed.

(7) In the prediction device 20 according to any one of (4) to (6), the machine learning device 30 according to any one of (1) to (3) may be further included.

By doing so, it is possible for the prediction device 20 to achieve the same effects as any of the above-described (1) to (6).

(8) A control device 15 according to the present disclosure includes a prediction device 20 according to any one of (4) to (7).

According to this control device 15, it is possible to obtain the same effects as any of the above-described (4) to (7).

EXPLANATION OF REFERENCE NUMERALS 10 machine tool
15 control device 20 prediction device
201 input unit
202 prediction unit
203 determination unit
250 learned model
30 machine learning device
301 state observation unit
302 label acquisition unit
303 learning unit
50 server

What is claimed is:

1. A machine learning device that generates a learned model that is configured to be used by a prediction device comprising:
a state observation unit that acquires, as input data, manual feed state information including a manual feed pulse waveform at a time of a manual feed operation performed in a machine tool capable of manual feed;
a label acquisition unit that acquires label data indicating a distance by which a movable part of the machine tool moved within a predetermined time immediately after the manual feed pulse waveform of the manual feed state information included in the input data; and
a learning unit that executes supervised learning by applying a neural network and using the input data acquired by the state observation unit and the label data acquired by the label acquisition unit, and generates the learned model which is then used by the prediction device to predict the distance by which the movable part of the machine tool moved based on the manual feed state information.

2. The machine learning device according to claim 1, wherein the manual feed state information includes at least any one of a distance to an interference object at a time of the manual feed operation, user identification information of a user who performed the manual feed operation, a date and time when the manual feed operation was performed, and an axis number operated in the manual feed operation.

3. The machine learning device according to claim 1, wherein
the state observation unit acquires the input data for each model of the machine tool,
the label acquisition unit acquires the label data for each model of the machine tool; and
the learning unit generates a learned model for each model of the machine tool by using the input data and the label data for each model of the machine tool.

4. A prediction device comprising:
a learned model generated by the machine learning device according to claim 1;
an input unit that inputs the manual feed state information of manual feed currently performed with respect to a machine tool capable of manual feed; and
a prediction unit that inputs the manual feed state information inputted by the input unit to the learned model and predicts a moving distance of a movable part of the machine tool after a predetermined time from a present time based on the manual feed state information.

5. The prediction device according to claim 4, wherein the prediction unit cyclically predicts the moving distance at a shorter time interval than the predetermined time.

6. The prediction device according to claim 4, wherein the learned model is included in a server that is accessibly connected via a network from the prediction device.

7. A prediction device comprising:
the machine learning device according to claim 1;
the learned model generated by the machine learning device;
an input unit that inputs the manual feed state information of manual feed currently performed with respect to a machine tool capable of manual feed; and
a prediction unit that inputs the manual feed state information inputted by the input unit to the learned model and predicts a moving distance of a movable part of the machine tool after a predetermined time from a present time based on the manual feed state information.

8. A control device comprising the prediction device according to claim 4.

* * * * *